(12) United States Patent
Hu et al.

(10) Patent No.: US 11,836,837 B2
(45) Date of Patent: Dec. 5, 2023

(54) VIDEO GENERATION METHOD, DEVICE AND STORAGE MEDIUM

(71) Applicant: Beijing Baidu Netcom Science Technology Co., Ltd., Beijing (CN)

(72) Inventors: Tianshu Hu, Beijing (CN); Zhibin Hong, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 185 days.

(21) Appl. No.: 17/498,249

(22) Filed: Oct. 11, 2021

(65) Prior Publication Data
US 2022/0028143 A1  Jan. 27, 2022

(30) Foreign Application Priority Data
Feb. 5, 2021 (CN) .......................... 202110163607.1

(51) Int. Cl.
| | |
|---|---|
| *G06T 13/20* | (2011.01) |
| *G06N 20/00* | (2019.01) |
| *G06T 13/40* | (2011.01) |
| *G06T 13/80* | (2011.01) |
| *G10L 15/02* | (2006.01) |

(52) U.S. Cl.
CPC .......... *G06T 13/205* (2013.01); *G06N 20/00* (2019.01); *G06T 13/40* (2013.01); *G06T 13/80* (2013.01); *G10L 15/02* (2013.01)

(58) Field of Classification Search
CPC ........ G06N 3/088; G06N 20/00; G06N 3/045; G06T 13/40; G06T 13/80; G06T 13/205; G06T 2213/08; G06T 9/002; G10L 21/10; G10L 15/02; G10L 25/57; G10L 25/63; G10L 15/04; G10L 15/22; G06F 3/011; G06F 3/167
See application file for complete search history.

(56) References Cited

U.S. PATENT DOCUMENTS

| | | | |
|---|---|---|---|
| 10,360,716 B1 * | 7/2019 | van der Meulen | ..... G10L 25/57 |
| 10,621,771 B2 * | 4/2020 | Matts | ................... G06V 40/172 |

(Continued)

FOREIGN PATENT DOCUMENTS

| | | |
|---|---|---|
| CN | 111383307 A | 7/2020 |
| CN | 111432233 A | 7/2020 |

(Continued)

OTHER PUBLICATIONS

The Extended European Search Report dated Sep. 5, 2022, for Application No. 21202760.1 (13 pages).

(Continued)

*Primary Examiner* — Xilin Guo
(74) *Attorney, Agent, or Firm* — KDW Firm PLLC

(57) ABSTRACT

Provided are a video generation method and apparatus, a device and a storage medium, relating to the field of artificial intelligence and, in particular, to the fields of computer vision and deep learning. The method includes changing a character emotion of an original character image according to a character emotion feature of a to-be-generated video to obtain a target character image; and driving the target character image by use of a character driving network and based on a speech segment to obtain the to-be-generated video.

14 Claims, 5 Drawing Sheets

(56) References Cited

U.S. PATENT DOCUMENTS

| | | | | |
|---|---|---|---|---|
| 2012/0130717 A1* | 5/2012 | Xu | ................... | G06T 13/40 345/473 |
| 2019/0163965 A1 | 5/2019 | Yoo et al. | | |
| 2021/0287657 A1* | 9/2021 | Deng | ................ | G06F 40/30 |

FOREIGN PATENT DOCUMENTS

| | | |
|---|---|---|
| CN | 111666831 A | 9/2020 |
| CN | 112215927 A | 1/2021 |
| CN | 112232220 A | 1/2021 |
| KR | 20180132364 A | 12/2018 |

OTHER PUBLICATIONS

Brownlee, J., "How to One Hot Encode Sequence Data in Python", Aug. 14, 2019. Retrieved from the Internet: https://machinelearningmastery.com/how-to-one-hot-encode-sequence-data-in-python/.

Joshi et al., "Learning controls for blend shape based realistic facial animation", ACM SIGGRAPH Asia 2009, ACM Press, Jul. 31, 2005, pp. 8-es. https://doi.org/10.1145/1185657.1185857.

Partial European Search Report for Application No. EP 21202760.1, dated 20.04.2022 (13 pages).

Fried et al: "Text-based editing of talking-head video", ACM Trans Graph 38(4): 1-14 (2019). DOI:10.1145/3306346.3323028.

Liu et al: "Stgan: A Unified Selective Transfer Network for Arbitrary Image Attribute Editing", 2019 IEEE/CVF Conference on Computer Vision and Pattern Recognition (CVPR), IEEE, Jun. 15, 2019 (Jun. 15, 2019), pp. 3668-3677, DOI:10.1109/CVPR.2019.00379.

Tolosana et al: "DeepFakes and Beyond: A Survey of Face Manipulation and Fake Detection", arxiv.org, Cornell University Library, 201 Olin Library Cornell University, Ithaca, NY 14853, Jun. 18, 2020.

Vougioukas et al: "Realistic Speech-Driven Facial Animation with GANs", arxiv.org, May 1, 2020 (May 1, 2020), pp. 1-16201 Olin Library Cornell University Ithaca, NY 14853 DOI: 10.1007/sll263-019-01251-8, Retrieved from the Internet: URL:https://arxiv.org/abs/1906.06337>.

First Official Action dated Jul. 5, 2022, for Chinese Patent Application No. 202110163607.1 (14 pages).

First Search Report dated Jun. 28, 2022, for Chinese Patent Application No. 202110163607.1 (four (4) pages).

* cited by examiner

VIDEO GENERATION METHOD, DEVICE AND STORAGE MEDIUM

CROSS-REFERENCE TO RELATED APPLICATION

This application claims priority to Chinese Patent Application No 202110163607.1 filed Feb. 5, 2021, the disclosure of which is incorporated herein by reference in its entirety.

TECHNICAL FIELD

The present application relates to the field of computer technology and, in particular, to the field of artificial intelligence, for example, the fields of computer vision and deep learning.

BACKGROUND

With the development of the artificial intelligence technology and the video technology, the image driving technology that drives a static image into a dynamic video gradually springs up. In the image driving technology, a static character image is driven, based on a speech segment, into a dynamic character video expressing this speech segment.

SUMMARY

The present application provides a video generation method and apparatus, a device and a storage medium.

According to an aspect of the present application, a video generation method is provided. The method includes changing a character emotion of an original character image according to a character emotion feature of a to-be-generated video to obtain a target character image; and driving the target character image by use of a character driving network and based on a speech segment to obtain the to-be-generated video.

According to another aspect of the present application, an electronic device is provided. The electronic device includes at least one processor and a memory communicatively connected to the at least one processor. The memory stores instructions executable by the at least one processor to enable the at least one processor to perform the following steps: changing a character emotion of an original character image according to a character emotion feature of a to-be-generated video to obtain a target character image; and driving the target character image by use of a character driving network and based on a speech segment to obtain the to-be-generated video.

According to another aspect of the present application, a non-transitory computer-readable storage medium is provided. The storage medium stores computer instructions for causing a computer to perform the following steps: changing a character emotion of an original character image according to a character emotion feature of a to-be-generated video to obtain a target character image; and driving the target character image by use of a character driving network and based on a speech segment to obtain the to-be-generated video.

It is to be understood that the content described in this part is neither intended to identify key or important features of embodiments of the present application nor intended to limit the scope of the present application. Other features of the present application are apparent from the description provided hereinafter.

BRIEF DESCRIPTION OF DRAWINGS

The drawings are intended to provide a better understanding of the present solution and not to limit the present application.

DETAILED DESCRIPTION

Example embodiments of the present application, including details of embodiments of the present application, are described hereinafter in conjunction with the drawings to facilitate understanding. The example embodiments are illustrative only. Therefore, it is to be understood by those of ordinary skill in the art that various changes and modifications may be made to the embodiments described herein without departing from the scope and spirit of the present application. Similarly, description of well-known functions and structures is omitted hereinafter for clarity and conciseness.

Figure 1A:
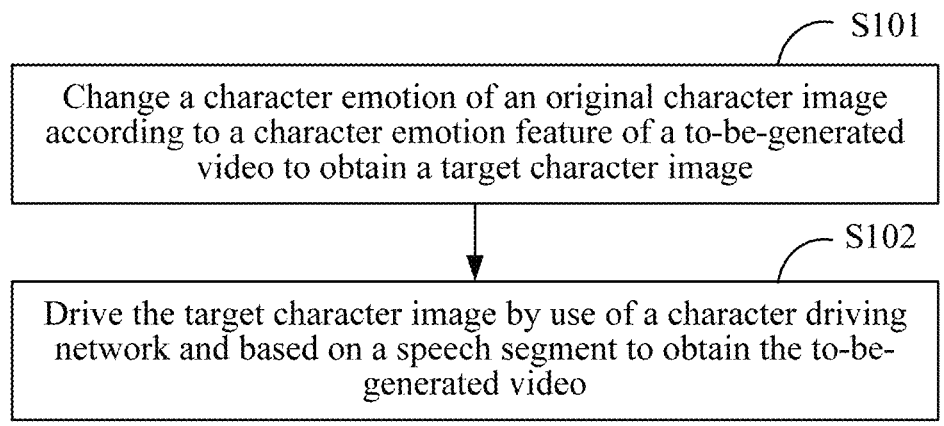
FIG. 1A is a flowchart of a video generation method according to an embodiment of the present application.
Figure 1B:
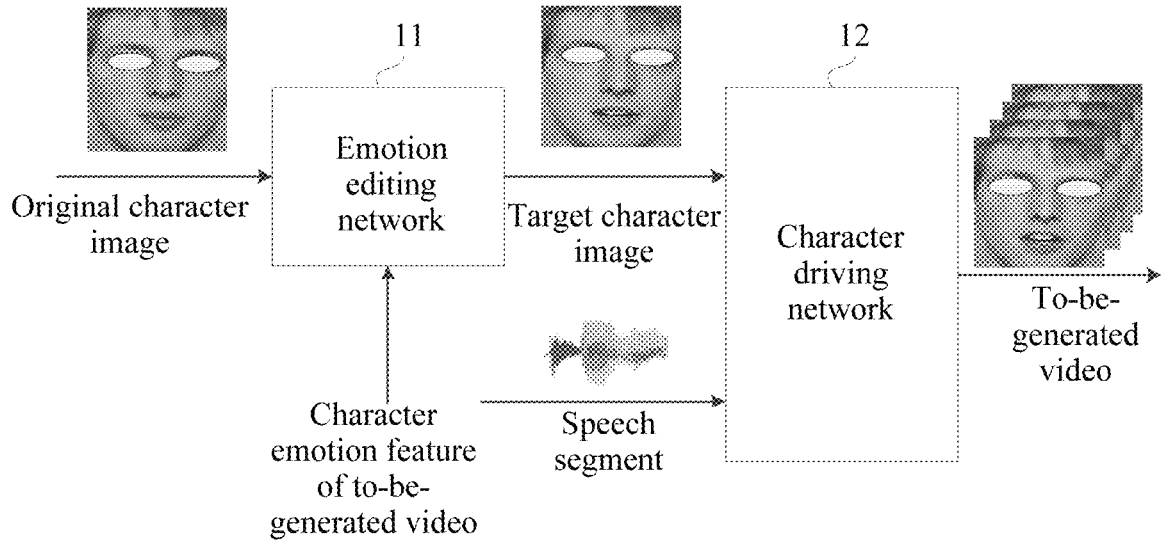
FIG. 1B is a diagram of a network architecture for performing a video generation method according to an embodiment of the present application.

FIG. 1A is a flowchart of a video generation method according to an embodiment of the present application. FIG. 1B is a diagram of a network architecture for performing a video generation method according to an embodiment of the present application. This embodiment is applicable to the case where a character image is driven by using a speech to generate a character video. This embodiment may be performed by a video generation apparatus configured in an electronic device. The apparatus may be implemented as software and/or hardware. As shown in FIGS. 1A and 1B, the method includes the steps below.

In S101, a character emotion of an original character image is changed according to a character emotion feature of a to-be-generated video so that a target character image is obtained.

In this embodiment of the present application, a static character image may be driven by use of the image driving technology and based on a speech segment so that a character video, that is, the to-be-generated video, in which a character in the static character image expresses the speech segment is obtained. The character emotion feature of the to-be-generated video may be a feature corresponding to the character emotion when the character in the to-be-generated video expresses the speech segment. The character emotion feature may be represented by, for example, a vector or a matrix. For example, if the character emotion feature is represented by a vector, the vector may be a one-hot vector. Optionally, the character emotion according to this embodiment of the present application may include, but is not limited to the following types: happy, sad, annoyed, frightened and angry. The original character image may be a static character image that a user wants to drive through a speech segment. The target character image may be a character image obtained after a character emotion of the original character image has been changed and/or edited. For example, assuming that the character emotion of the original character image is no emotion, and the character emotion of the to-be-generated video is a happy emotion, then the target character image is a character image obtained after the character emotion of the original character image is edited from no emotion to the happy emotion.

It is to be noted that in this embodiment of the present application, the original character image and the target character image correspond to the same character but correspond to different character emotion features. The character emotion feature of the target character image depends on the character emotion feature of the to-be-generated video. In this embodiment of the present application, the character emotion feature of the to-be-generated video may be set by the user according to a personalized demand. For example, when the user wants a target character to use a certain emotion to express the speech segment, the user sets a feature corresponding to this emotion as the character emotion feature of the to-be-generated video. Alternatively, a system analyzes the character emotion expressed by the speech segment of the to-be-driven character image and determines the character emotion feature of the to-be-generated video based on this character emotion. For example, when the character emotion expressed by the speech segment is sad, the determined character emotion feature of the to-be-generated video is a feature corresponding to the sad emotion.

Optionally, in this embodiment of the present application, the character emotion of the original character image may be changed according to the character emotion feature of the to-be-generated video in many manners. These manners are not limited in this embodiment.

Manner one: The character emotion of the original character image is changed according to the character emotion feature of the to-be-generated video by using an image processing algorithm, such as a simulation transformation processing algorithm. For example, it is feasible to determine, according to the character emotion feature of the original character image and the character emotion feature of the to-be-generated video, a position transformation matrix corresponding to the transformation from the character emotion feature of the original character image to the character emotion feature of the to-be-generated video and then perform, based on the position transformation matrix, affine transformation processing of the position of a key point of a region (for example, lip region or limb region) to be driven to change in the original character image to obtain the target character image.

Manner two: The character emotion of the original character image is changed by use of an emotion editing network and based on the character emotion feature of the to-be-generated video to obtain the target character image. The emotion editing network is a neural network dedicated to editing an emotion of a character in a character image and changing the emotion of the character in the character image. The training process of the emotion editing network is described in detail in subsequent embodiments. For example, as shown in FIG. 1B, in manner two, the character emotion feature of the original character image and the character emotion feature of the to-be-generated video are input into the pretrained emotion editing network 11. Then the emotion editing network 11 analyzes the input original character image and character emotion feature based on the algorithm used in training, edits and changes the original character emotion of the original character image based on the input character emotion feature, and then outputs the changed character image, that is, the target character image. Optionally, in this embodiment of the present application, it is preferable to use manner two, that is, to use the emotion editing network to change the character emotion of the original character image. Manner two is better than manner one in that manner two enables the changed character emotion of the target character image to be more natural and the effect to be more realistic.

In S102, the target character image is driven by use of a character driving network and based on a speech segment so that the to-be-generated video is obtained.

The character driving network according to this embodiment of the present application may be a neural network for driving a static character image based on a speech segment to generate a character video having the content that a character in the character image expresses the speech segment. The character driving network may be obtained by being pretrained using a large number of sample speech segments, sample character images and sample character videos. The speech segment may be audio data used when the static character image is driven.

Optionally, as shown in FIG. 1B, in this embodiment of the present application, the speech segment and the target character image obtained after the character emotion is changed in S101 are input to the character driving network 12; and the character driving network 12 performs analysis, coding and decoding processing of the input speech segment and target character image based on the algorithm used in model training and obtains and outputs the character video, that is, the to-be-generated video, generated after the target character image is driven based on the speech segment. In the character video generated, the character in the original character image expresses the speech segment.

Optionally, in this embodiment of the present application, if the operation of changing the character emotion of the original character image according to the character emotion feature of the to-be-generated video in S101 is performed by using the emotion editing network, then the emotion editing network used for performing the operation of S101 and a face driving network used for performing the operation of S102 may be deployed separately in two network models or may be deployed in one network model. The deployment manner is not limited in this embodiment. If the emotion editing network and the face driving network are deployed in different network models, the two networks are independent of each other. The trained emotion editing network can be embedded in the existing face driving network. Similarly, the trained face driving network can be embedded in the existing emotion editing network. When one of the networks needs to be updated, there is no need to retrain the other network, reducing the cost of model training and bringing about a good portability. If the emotion editing network and the face driving network are deployed in one network model, the two networks can be coupled to each other in training, improving the effect of the finally output character video. In this embodiment of the present application, the emotion editing network and the face driving network may be deployed in a certain manner according to actual requirements.

In the solution according to this embodiment of the present application, the character emotion of the original character image is edited according to the character emotion feature of the to-be-generated video, and an original character image containing the changed emotion (that is, the target character image) is driven by use of the character driving network and based on the speech segment to obtain a character video containing the target character image expressing the speech segment (that is, the to-be-generated video). In the solution according to this embodiment of the present application, when a static original character image provided by a user is driven based on a speech segment, a character emotion of a generated character video can be edited, that is, the character emotion of the generated character video can be different from a character emotion of the original character image provided by the user. In this manner, the flexibility and interestingness of generating the character video by using the image driving technology are improved, and a new idea is provided for the development of the image driving technology.

Figure 2:
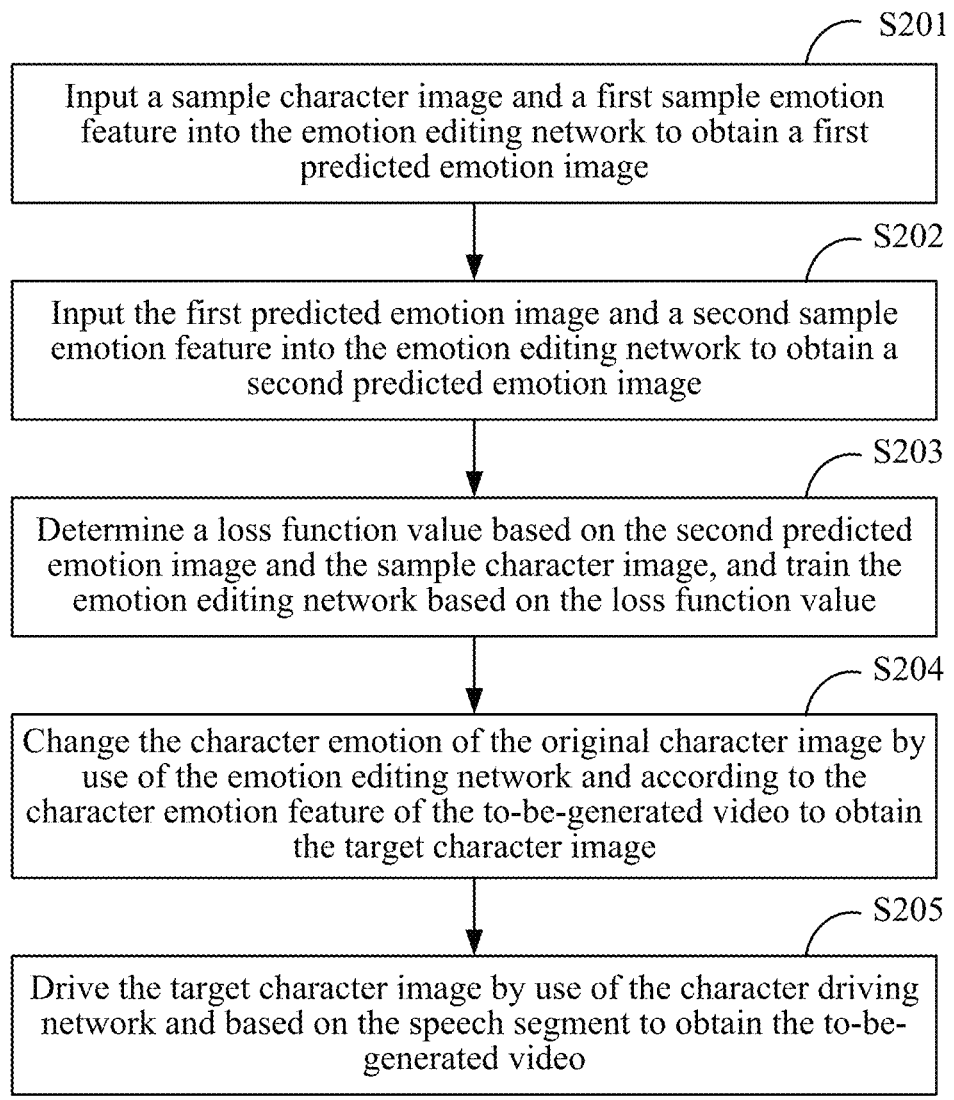
FIG. 2 is a flowchart of another video generation method according to an embodiment of the present application.

FIG. 2 is a flowchart of another video generation method according to an embodiment of the present application. Based on the preceding embodiment, the training process of the emotion editing network for changing the character emotion of the original character image is added in this embodiment. As shown in FIG. 2, the method includes the steps below.

In S201, a sample character image and a first sample emotion feature are input into the emotion editing network so that a first predicted emotion image is obtained.

The sample character image may be a training sample required for training the emotion editing network. The sample character image used in this embodiment of the present application is preferably a sample character image containing multiple different character emotion types. In this embodiment, for each sample character image, a character emotion feature corresponding to the each sample character image is used as a second sample emotion feature. In this embodiment, the first sample emotion feature is a character emotion feature based on which a character emotion of a sample character image is changed. For example, if the second sample emotion feature corresponding to the sample character image is a happy emotion feature, the first sample emotion feature may be an emotion feature desired to be changed to an emotion feature other than the happy emotion feature, for example, a sad emotion feature. The first predicted emotion image may be an image obtained after the emotion editing network edits the character emotion of the sample character image from the second emotion type to the first emotion type. The character emotion type of the first predicted emotion image is the character emotion type corresponding to the first sample emotion feature. It is to be noted that in this embodiment of the present application, a sample emotion corresponding to the first sample emotion feature and a sample emotion corresponding to the second sample emotion feature are each a character emotion. The sample emotion may include, but is not limited to, the following emotion types: happy, sad, annoyed, frightened and angry. A trained emotion editing network can edit sample emotion types used in network training.

Optionally, in this embodiment, when the emotion editing network is trained, the sample character image and the first sample emotion feature may be input into a constructed emotion editing network. The constructed emotion editing network edits the character emotion of the sample character image from the second sample emotion type to the first sample emotion type based on the first sample emotion feature. The edited sample character image is the first predicted emotion image.

In S202, the first predicted emotion image and a second sample emotion feature are input into the emotion editing network so that a second predicted emotion image is obtained.

Optionally, in this embodiment, after the first predicted emotion image is obtained, the first predicted emotion image and the second sample emotion feature may be used as the input of the emotion editing network. Then the emotion editing network edits the character emotion of the input first predicted emotion image from the first sample emotion type to the second sample emotion type based on the input second sample emotion feature. The edited first predicted emotion image is the second predicted emotion image.

It is to be noted that the first predicted emotion image and the first sample emotion feature correspond to a first emotion type. The sample character image, the second predicted emotion image and the second sample emotion feature correspond to a second emotion type. That is, the sample character image, the first predicted emotion image and the second predicted emotion image correspond to the same character, that is, a character in the sample character image. However, the first predicted emotion image corresponds to the first emotion type. The emotion feature corresponding to the first emotion type is the first sample emotion feature. The sample character image and the second predicted emotion image correspond to the same character emotion type, that is, the second emotion type. The emotion feature corresponding to the second emotion type is the second sample emotion feature. The first emotion type and the second emotion type are two different emotion types.

In S203, a loss function value is determined based on the second predicted emotion image and the sample character image, and the emotion editing network is trained based on the loss function value.

Optionally, since the emotion editing network is still in the training process, although the sample character image and the second predicted emotion image correspond to the same character and the same character emotion type, the second predicted emotion image may be not completely restored to the sample character image. At this time, in this embodiment of the present application, it is feasible to complete one training session of the emotion editing network by calculating, through the similarity between the second predicted emotion image and the sample character image, the loss function value corresponding to the current prediction of the emotion editing network and by adjusting network parameters in the emotion editing network based on the loss function value.

In this embodiment of the present application, the emotion editing network may be trained multiple times according to the manners of the preceding S201 to S203 by using a large number of sample character images corresponding to different emotion types until the loss function value is less than a preset value. At this time, training of the emotion editing network is completed. Alternatively, after the training of the emotion editing network reaches a preset duration or a preset number of times, the accuracy of the trained emotion editing network may be tested by using the test data. If the accuracy of the trained emotion editing network reaches a preset requirement, the training of the emotion editing network is completed.

In S204, the character emotion of the original character image is changed by use of the emotion editing network and according to the character emotion feature of the to-be-generated video so that the target character image is obtained.

Optionally, in this embodiment of the present application, the character emotion of the original character image is changed by use of the emotion editing network obtained by being trained in S201 to S203 and based on the character emotion feature of the to-be-generated video to obtain the target character image.

In S205, the target character image is driven by use of the character driving network and based on the speech segment so that the to-be-generated video is obtained.

In the solution according to this embodiment of the present application, a sample character image and a first sample emotion feature are input into the emotion editing network so that a first predicted emotion image is obtained, the first predicted emotion image and a second sample emotion feature are input into the emotion editing network so that a second predicted emotion image is obtained, and then a loss function value is determined based on the second predicted emotion image and the sample character image, and the emotion editing network is trained based on the loss function value. In this manner, the trained emotion editing network is obtained. Further, based on the character driving network and the trained emotion editing network, the original character image is driven based on the speech segment to generate the character video in which the character whose character emotion has been changed expresses the speech segment. In the solution according to this embodiment of the present application, the emotion editing network is trained in an unsupervised manner. In the unsupervised training manner, the emotion editing network is trained based on the sample character image, where there is no need to preprocess the sample character image. The unsupervised training manner ensures the accuracy of network training, greatly simplifies the complexity of network training and provides a new idea for training of the emotion editing network.

Figure 3:
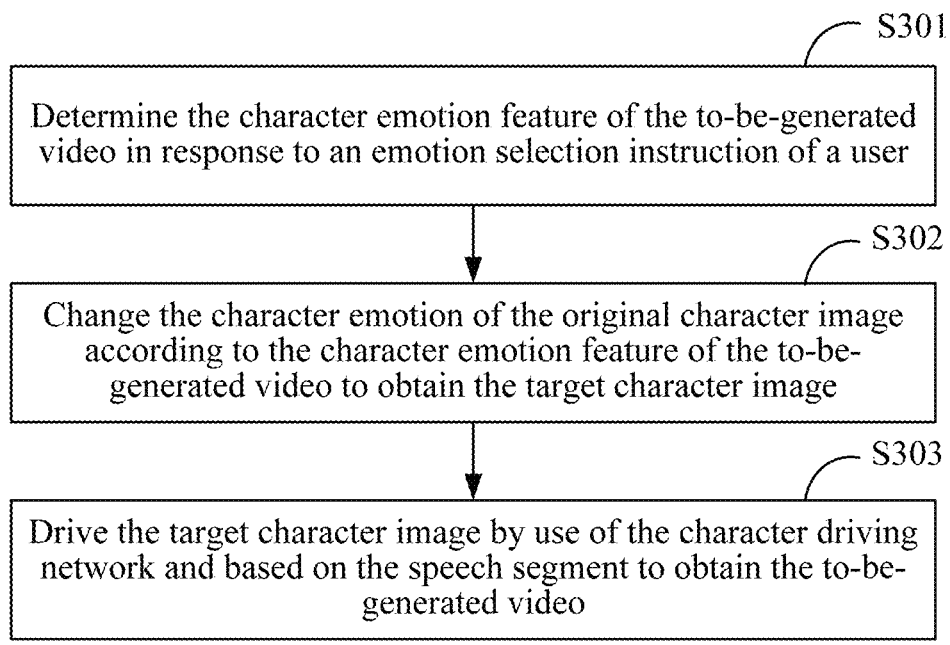
FIG. 3 is a flowchart of another video generation method according to an embodiment of the present application.

FIG. 3 is a flowchart of another video generation method according to an embodiment of the present application. Based on the preceding embodiments, how to determine the character emotion feature of the to-be-generated video is described in detail in this embodiment. As shown in FIG. 3, the method includes the steps below.

In S301, the character emotion feature of the to-be-generated video is determined in response to an emotion selection instruction of a user.

The emotion selection instruction may be an instruction triggered when the user selects the emotion type to be edited this time according to the demand (that is, the desired emotion type of the character in the to-be-generated video). The emotion selection instruction includes at least the character emotion type selected for the to-be-generated video. Optionally, in this embodiment of the present application, an electronic device configured with a video generation apparatus may provide a visual interface for the user. The visual interface displays all editable character emotion types to the user. The editable character emotion types may include, but are not limited to, happy, sad, annoyed, frightened and angry. When the user needs to drive the original character image through a speech segment, if the user wants to edit the character emotion type of the generated character video, the user may trigger generation of the emotion selection instruction including a to-be-edited character emotion type by selecting the to-be-edited character emotion type on the visual interface when uploading the speech segment and the original character image to the electronic device. Alternatively, the user may trigger generation of the emotion selection instruction by speech control.

Optionally, in this embodiment of the present application, after the user triggers generation of the emotion selection instruction based on all editable character emotion types displayed on the visual interface, the electronic device determines, in response to the emotion selection instruction, the character emotion type selected for the to-be-generated video by the user. Then the electronic device generates the feature of the character emotion type and uses the feature of the character emotion type as the character emotion feature of the to-be-generated video. For example, the feature corresponding to each editable character emotion type displayed on the visual interface may be preconfigured. In this case, the feature corresponding to the character emotion type selected for the to-be-generated video by the user may be acquired based on this configuration information. Alternatively, a corresponding character emotion feature may be generated, in a preset coding scheme, for the character emotion type selected for the to-be-generated video by the user. The generation manner is not limited in this embodiment. The coding scheme may include, but is not limited to, the two manners below.

Manner one: A character emotion type of the to-be-generated video and a candidate emotion type of the to-be-generated video are determined in response to the emotion selection instruction of the user; and one-hot encoding is performed on the character emotion type of the to-be-generated video and the candidate emotion type of the to-be-generated video so that the character emotion feature of the to-be-generated video is obtained. For example, in manner one, the character emotion type selected for the to-be-generated video by the user is determined in response to the emotion selection instruction triggered by the user and is used as the character emotion type of the to-be-generated video; and then other editable character emotion types provided by the electronic device are used as candidate emotion types, and feature encoding processing is performed by use of the one-hot encoding algorithm and based on the determined character emotion type and candidate emotion types of the to-be-generated video. That is, the feature value corresponding to the character emotion type of the to-be-generated video is set to a first preset value (for example, 1), and the feature value corresponding to the candidate emotion type is set to a second preset value (for example, 2). In this manner, the character emotion feature of the to-be-generated video is obtained. For example, it is assumed that editable character emotion types provided by the electronic device include happy, sad, annoyed, frightened and angry, the character emotion type of the to-be-generated video is happy, and the candidate emotion types are sad, annoyed, frightened and angry. In this case, based on one-hot encoding processing, the vector value corresponding to happy is set to 1, and the vector values corresponding to other emotions are set to 0, that is, the generated one-hot vector is (10000); similarly, if the character emotion type of the to-be-generated video is annoyed, the generated one-hot vector is (00100). In this case, the one-hot vector is the character emotion feature of the generated video. In manner one, the character emotion feature of the to-be-generated video is determined in a one-hot encoding manner. With this configuration, the character emotion feature of the to-be-generated video can be determined quickly and accurately when a large number of character emotion types can be edited. Moreover, feature preconfiguration is not required for the large number of editable character emotion types so that the process of determining the emotion feature is simplified. Furthermore, feature dimensions can be expanded when a large number of character emotion types can be edited. For example, the number of dimensions of character emotion features generated for character emotion types is equal to the number of editable character emotion types.

Manner two: A character emotion type of the to-be-generated video and the emotion degree of the character emotion type are determined in response to the emotion selection instruction of the user; and the character emotion feature of the to-be-generated video is generated based on the character emotion type and the emotion degree. The emotion selection instruction of the user in this manner includes not only the character emotion type selected for the to-be-generated video by the user, but also the emotion degree selected for the character emotion type by the user. For example, the degree may include at least two degree levels. The higher the level corresponding to the emotion degree, the greater the expression fluctuation when the character expresses the emotion type. For example, if the emotion type of the character is happy, the higher the degree of happiness, the greater the degree of opening of the user's mouth. In this manner, the character emotion type selected for the to-be-generated video by the user and the emotion degree selected for the character emotion type by the user are determined in response to the emotion selection instruction triggered by the user, a first subfeature corresponding to the character emotion type and a second subfeature corresponding to the emotion degree are generated, and then the first subfeature and the second subfeature are combined so that the character emotion feature of the to-be-generated video is obtained. The character emotion feature of the to-be-generated video determined in this manner includes not only the feature corresponding to the emotion type, but also the feature corresponding to the emotion degree. The character emotion feature is represented in multiple dimensions so that the accuracy of the character emotion feature is improved, and the character emotion edited based on the character emotion feature is more vivid and accurate.

In S302, the character emotion of the original character image is changed according to the character emotion feature of the to-be-generated video so that the target character image is obtained.

Optionally, it is feasible in this embodiment of the present application to use the emotion editing network to perform the operation of this step by regarding the character emotion feature of the to-be-generated video determined in S301 as a hidden code, inputting the hidden code and the original character image into the emotion editing network and then using the emotion editing network to edit and change the character emotion of the original character image based on the input character emotion feature. In this manner, the target character image is obtained.

In S303, the target character image is driven by use of the character driving network and based on the speech segment so that the to-be-generated video is obtained.

In the solution according to this embodiment of the present application, the character emotion feature of the to-be-generated video is determined in response to the emotion selection instruction triggered by the user, the character emotion of the original character image is changed according to the character emotion feature of the to-be-generated video so that the target character image is obtained, and then the target character image is driven by use of the character driving network and based on the speech segment so that the to-be-generated video in which the character whose emotion has been changed expresses the speech segment. The solution according to this embodiment enables a higher accuracy than the solution of extracting a character emotion feature from a speech segment in that usually multiple emotion features are extracted from one speech segment, for example, multiple emotion features including surprised, happy and angry may be extracted from one loud speech segment. The solution according to this embodiment solves this problem well by enabling the user to select and determine the character emotion feature of the to-be-generated video so that the character emotion feature can be determined more accurately. Moreover, the solution according to this embodiment satisfies the user demand for personalized setting of character emotion types, based on the same original character image and the same speech segment, character videos corresponding to different character emotions can be driven. As a result, the solution according to this embodiment enables a higher flexibility and better satisfies the user demand for personalization.

Figure 4A:
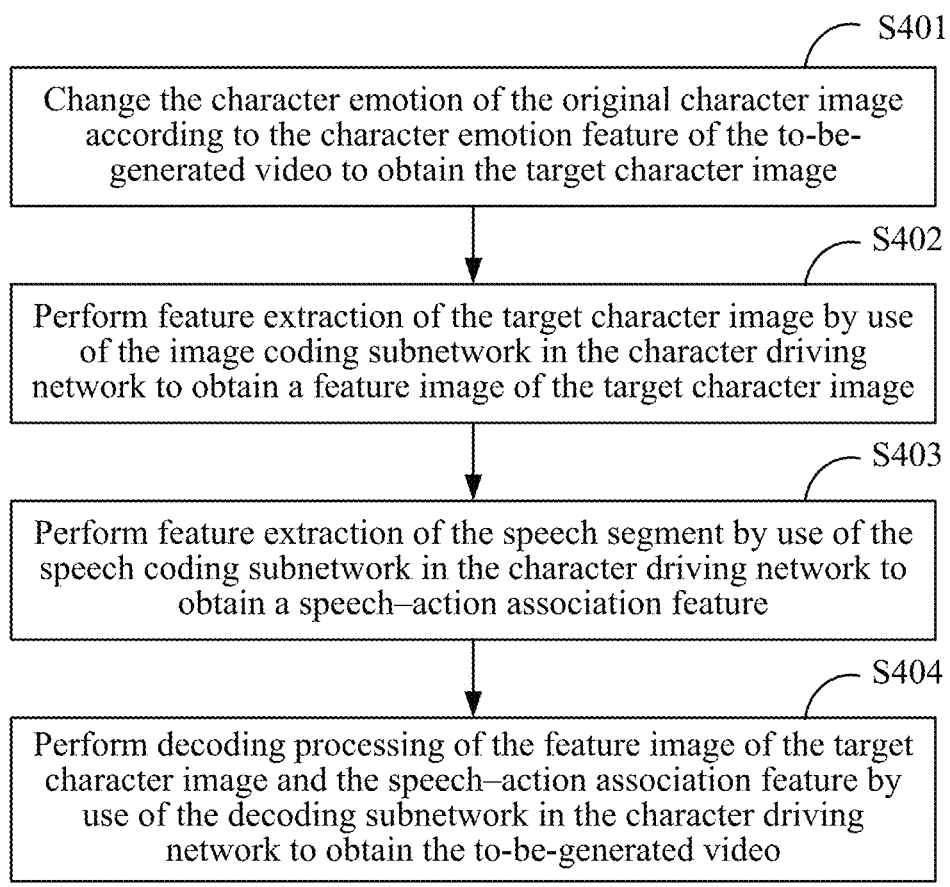
FIG. 4A is a flowchart of another video generation method according to an embodiment of the present application.
Figure 4B:
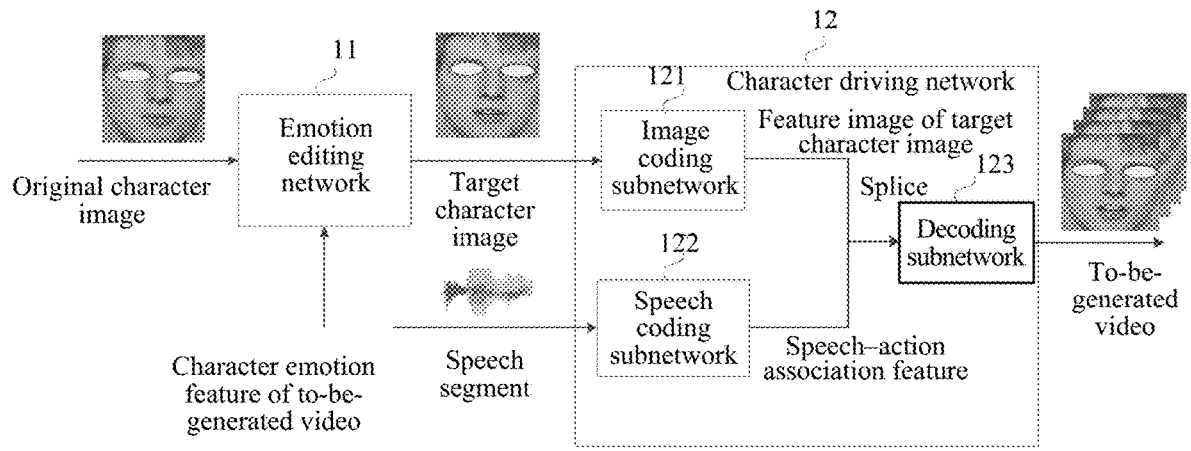
FIG. 4B is a diagram of another network architecture for performing a video generation method according to an embodiment of the present application.

FIG. 4A is a flowchart of another video generation method according to an embodiment of the present application. FIG. 4B is a diagram of another network architecture for performing a video generation method according to an embodiment of the present application. Based on the preceding embodiments, how to drive the target character image by use of the character driving network and based on the speech segment to obtain the to-be-generated video is described in this embodiment.

Optionally, as shown in FIG. 4B, the network architecture for performing the video generation method according to this embodiment of the present application includes an emotion editing network 11 and a character driving network 12. The character driving network 12 includes an image coding subnetwork 121, a speech coding subnetwork 122 and a decoding subnetwork 123. The original character image and the character emotion feature of the to-be-generated video are the input of the emotion editing network 11. The output of the emotion editing network 11 is connected to the input of the image coding subnetwork 121 in the character driving network 12. The speech segment is the input of the speech coding subnetwork 122 in the character driving network 12. The output of the image coding subnetwork 121 and the output of the speech coding subnetwork 122 are connected to the input of the decoding subnetwork 123 in the character driving network 12. The output of the decoding subnetwork 123 is the output in the character driving network 12.

As shown in FIGS. 4A and 4B, the method includes the steps below.

In S401, the character emotion of the original character image is changed according to the character emotion feature of the to-be-generated video so that the target character image is obtained.

Optionally, in this embodiment of the present application, the emotion editing network may change the character emotion of the original character image according to the character emotion feature of the to-be-generated video to obtain the target character image is obtained. For example, as shown in FIG. 4B, the static original character image and the character emotion feature of the to-be-generated video are input into the emotion editing network 11. Then the emotion editing network 11 changes the original character feature of the original character image to the character emotion feature of the to-be-generated video based on the input character emotion feature of the to-be-generated video to obtain the target character image. Then the emotion editing network 11 transmits the target character image to the image coding subnetwork 121 in the character driving network 12.

In S402, feature extraction of the target character image is performed by use of the image coding subnetwork in the character driving network so that a feature image of the target character image is obtained.

The feature image of the target character image is an image corresponding to the character feature extracted from the target character image. The character feature includes, but is not limited to, a key point feature of the limbs and the facial features, a skin color feature, and a posture feature of the character.

Optionally, as shown in FIG. 4B, after acquiring the target character image transmitted by the emotion editing network 11, the image coding subnetwork 121 in the character driving network 12 parses and encodes the target character image to obtain the feature image corresponding to the character feature of the target character image and then transmits the obtained feature image to the decoding subnetwork 123 in the character driving network 12.

In S403, feature extraction of the speech segment is performed by use of the speech coding subnetwork in the character driving network so that a speech-action association feature is obtained.

The speech-action association feature may be an association between the speech extracted from the speech segment and an action and shape of a character. For example, while the character is expressing the speech segment, the most significant change is in the lip shape. Therefore, the association between the speech and the lip shape of the face may be used as the speech-action association feature. If the limb shape also changes while the character is expressing the speech segment, the association between the speech and the limb shape may also be used as the speech-action association feature.

Optionally, as shown in FIG. 4B, a target speech segment is input into the speech coding subnetwork 122 in the character driving network 12. Then the speech coding subnetwork 122 parses and encodes the speech segment to obtain the speech-action association feature corresponding to the speech segment and then transmits the obtained feature image to the decoding subnetwork 123 in the character driving network 12.

In S404, decoding processing of the feature image of the target character image and the speech-action association feature is performed by use of the decoding subnetwork in the character driving network so that the to-be-generated video is obtained.

Optionally, as shown in FIG. 4B, the decoding subnetwork 123 in the character driving network 12 splices the speech-action association feature transmitted by the speech coding subnetwork 122 and the feature image of the target character image transmitted by the image coding subnetwork 121 and then decodes and analyzes the spliced speech-action association feature and feature image of the target character image to generate a character image sequence that includes the character feature of the feature image and that is driven by the speech-action association feature. The character image sequence may be composed of at least one driven character image frame. The longer the speech segment, the more the character image frames included in the generated character image sequence. For example, as shown in FIG. 4B, if the image feature is a key point feature of the facial features of the face, a skin color feature and a posture feature, then the speech-action association feature is the association between the speech and the lip shape of the face.

In this case, faces in the image frames in the driven character image sequence have the same key point feature, skin color feature and posture feature of the facial features except that positions of lip key points in different image frames are changed due to the driving of the speech-action association feature. After the character image sequence is obtained, video processing of character image frames in the character image sequence is performed according to the generation sequence of the character image frames so that the to-be-generated video is obtained.

Optionally, in this embodiment of the present application, the character driving network 12 may further include a discriminator subnetwork. The input of the discriminator subnetwork may be connected to the output of the decoding subnetwork 123. After the decoding subnetwork 123 obtains the to-be-generated video, the to-be-generated video may be input into the discriminator subnetwork. Then the discriminator subnetwork determines the realisticness of the video. If the output result of the discriminator sub-network is "realistic", the character driving network 12 outputs the to-be-generated video; otherwise, the character driving network 12 outputs error indication information indicating a video generation error, ensuring the accuracy of the character video output after the character image is driven based on the speech segment.

In the solution according to this embodiment of the present application, the character emotion of the original character image is edited and changed according to the character emotion feature of the to-be-generated video, the feature image of the target character image is extracted from the changed original character image (that is, the target character image) by use of the image coding subnetwork in the character driving network, the speech-action association feature is extracted from the speech segment by use of the speech coding subnetwork in the character driving network, and then the feature image of the target character image and the speech-action association feature are decoded by use of the decoding subnetwork in the character driving network so that the to-be-generated video is obtained. The solution according to this embodiment of the present application provides a preferred method of obtaining the to-be-generated video by combining the image coding subnetwork, the speech coding subnetwork and the decoding subnetwork in the character driving network and making these subnetworks cooperate with each other. In this method, the feature image of the target character image and the speech-action association feature are determined and decoded so that the to-be-generated video is obtained. In the determined to-be-generated video, the character emotion is changed while the character feature of the original character image is retained, and the content of the speech segment is expressed vividly and accurately through the change in the character action. In this manner, the to-be-generated video is more realistic.

Figure 5:
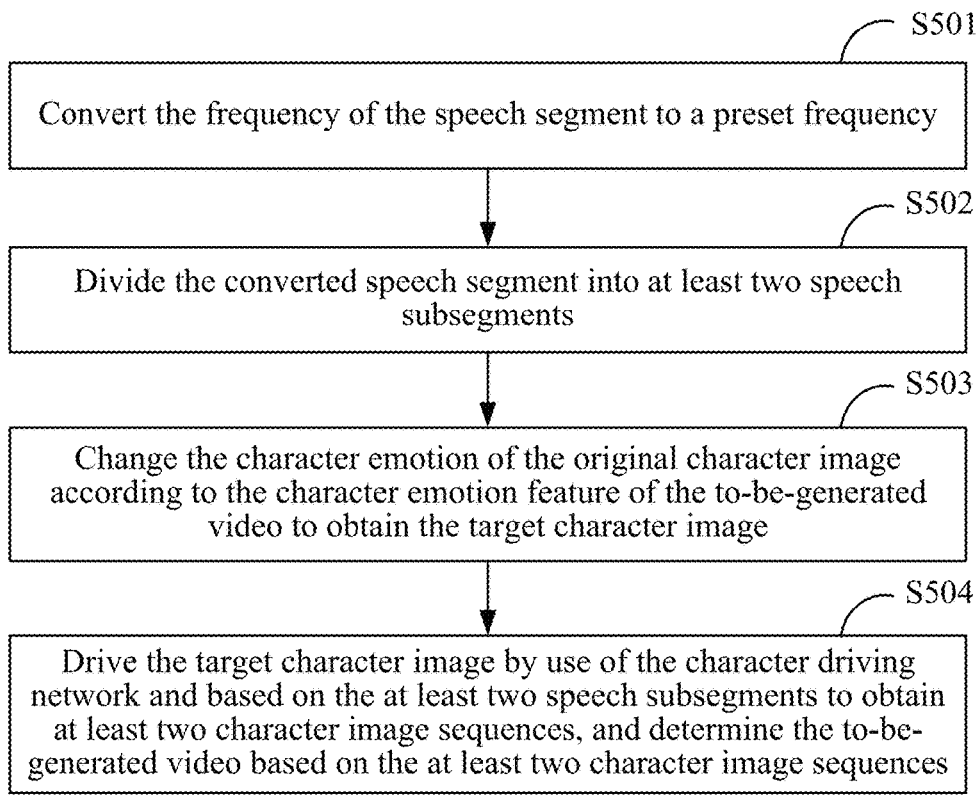
FIG. 5 is a flowchart of another video generation method according to an embodiment of the present application.

FIG. 5 is a flowchart of another video generation method according to an embodiment of the present application. This embodiment is an improvement on the preceding embodiments. In this embodiment, a preferred example is described in which a character image is driven based on a speech segment to generate a character video. As shown in FIG. 5, the method includes the steps below.

In S501, the frequency of the speech segment is converted to a preset frequency.

Optionally, to prevent difference from occurring between the frequency of the sample speech segment used in training of the character driving network and the frequency of the speech segment used in the current driving of the original character image and affecting the effect of the subsequently generated video, it is feasible in this embodiment to convert the frequency of the currently used speech segment according to the frequency of the sample speech segment used in training of the character driving network, that is, to convert the frequency of the currently used speech segment to the frequency of the sample speech segment used in training of the character driving network. Alternatively, it is feasible to preset a uniform preset frequency (for example, 160 kHz) and convert the frequency of the speech segment to be input into the character driving network to the preset frequency regardless of the use stage of the character driving network or the training stage of the character driving network. For example, the frequency of the speech segment is converted to the preset frequency so that different frequencies of speech segments less affect the operation effect of the character driving network.

In S502, the converted speech segment is divided into at least two speech subsegments.

Generally, the duration of the speech segment is relatively long. Optionally, to generate the character video later by extracting the speech-action association feature of the speech segment more accurately and determining the character image more accurately, it is feasible in this embodiment to divide the converted speech segment having the unified frequency into multiple speech subsegments. For example, it is feasible in this embodiment to divide the speech segment according to a commonly used video frame sampling frequency. For example, if the commonly used video frame sampling frequency is sampling at 0.2 s intervals, then it is feasible in this embodiment to divide the speech segment into multiple speech subsegments at 0.2 s intervals. Alternatively, it is feasible to perform word division processing or statement division processing of the speech segment by using the audio content corresponding to one word or statement in the speech segment as one speech subsegment. The speech segment may be divided in other manners in this embodiment. The division manner is not limited in this embodiment.

In S503, the character emotion of the original character image is changed according to the character emotion feature of the to-be-generated video so that the target character image is obtained.

In S504, the target character image is driven by use of the character driving network and based on the at least two speech subsegments so that at least two character image sequences are obtained, and the to-be-generated video is determined based on the at least two character image sequences.

Optionally, since the speech segment of the to-be-driven character image is divided into multiple speech subsegments in S502, it is feasible in this step to input the speech subsegments and the target character image into the trained character driving network according to the sequence of the speech subsegments in the original speech segment. The character driving network performs image driving processing of the target character image for each speech subsegment to obtain one character image sequence obtained by driving the target character image based on each speech subsegment. Then the character driving network performs video processing of image frames in each character image sequence according to the generation sequence of the image frames to obtain the to-be-generated video.

In the solution according to this embodiment of the present application, frequency conversion and division processing of the speech segment of the to-be-driven character image are performed so that at least one speech subsegment having a uniform frequency is obtained; the character emotion of the original character image is changed according to the character emotion feature of the to-be-generated video, and image driving processing of the changed original character image, that is, the target character image, is performed by use of the character driving network and based on each speech subsegment so that one character image sequence driven based on each speech subsegment is obtained; and the to-be-generated video is determined based on each character image sequence. In the solution according to this embodiment of the present application, the frequency of the speech segment is converted before the speech segment and the target character image are processed by using the character driving network so that different frequencies of speech segments less affect the image driving effect; and the sample speech data is divided so that the speech-action association feature of the whole speech segment can be extracted more accurately later and it is ensured to generate a vivid and realistic character video by use of the character driving network.

Figure 6:
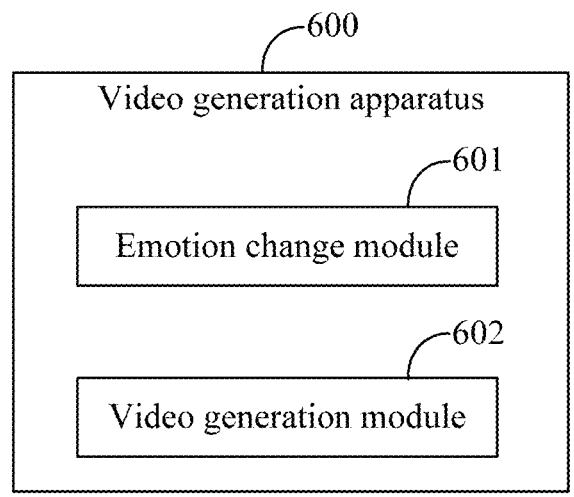
FIG. 6 is a diagram illustrating the structure of a video generation apparatus according to an embodiment of the present application.

FIG. 6 is a diagram illustrating the structure of a video generation apparatus according to an embodiment of the present application. This embodiment is applicable to the case where a character image is driven based on a speech to generate a character video. The apparatus can perform the video generation method according to any embodiment of the present application. The apparatus 600 includes an emotion change module 601 and a video generation module 602.

The emotion change module 601 is configured to change a character emotion of an original character image according to a character emotion feature of a to-be-generated video to obtain a target character image.

The video generation module 602 is configured to drive the target character image by use of a character driving network and based on a speech segment to obtain the to-be-generated video.

In the solution according to this embodiment of the present application, the character emotion of the original character image is edited according to the character emotion feature of the to-be-generated video, and an original character image (that is, the target character image) containing the changed emotion is driven by use of the character driving network and based on the speech segment to obtain a character video (that is, the to-be-generated video) containing the target character image expressing the speech segment. In the solution according to this embodiment of the present application, when a static original character image provided by a user is driven based on a speech segment, a character emotion of a generated character video can be edited, that is, the character emotion of the generated character video can be different from a character emotion of the original character image provided by the user. In this manner, the flexibility and interestingness of generating the character video by using the image driving technology are improved, and a new idea is provided for the development of the image driving technology.

Further, the emotion change module 601 is configured to change the character emotion of the original character image by use of an emotion editing network and according to the character emotion feature of the to-be-generated video to obtain the target character image.

Further, the apparatus further includes a model training module configured to input a sample character image and a first sample emotion feature into the emotion editing network to obtain a first predicted emotion image; input the first predicted emotion image and a second sample emotion feature into the emotion editing network to obtain a second predicted emotion image; and determine a loss function value based on the second predicted emotion image and the sample character image and train the emotion editing network based on the loss function value.

The first predicted emotion image and the first sample emotion feature correspond to a first emotion type. The sample character image, the second predicted emotion image and the second sample emotion feature correspond to a second emotion type.

Further, the apparatus further includes an emotion feature determination module configured to determine the character emotion feature of the to-be-generated video in response to an emotion selection instruction of a user.

Further, the emotion feature determination module is configured to determine a character emotion type of the to-be-generated video and a candidate emotion type of the to-be-generated video in response to the emotion selection instruction of the user; and perform one-hot encoding of the character emotion type of the to-be-generated video and the candidate emotion type of the to-be-generated video to obtain the character emotion feature of the to-be-generated video.

Further, the emotion feature determination module is further configured to determine a character emotion type of the to-be-generated video and an emotion degree of the character emotion type in response to the emotion selection instruction of the user; and generate the character emotion feature of the to-be-generated video based on the character emotion type and the emotion degree.

Further, the video generation module 602 is configured to perform, by use of an image coding subnetwork in the character driving network, feature extraction of the target character image to obtain a feature image of the target character image; perform, by use of a speech coding subnetwork in the character driving network, feature extraction of the speech segment to obtain a speech-action association feature; and perform, by use of a decoding subnetwork in the character driving network, decoding processing of the feature image of the target character image and the speech-action association feature to obtain the to-be-generated video.

Further, the apparatus further includes a frequency conversion module configured to convert a frequency of the speech segment to a preset frequency; and a speech division module configured to divide the converted speech segment into at least two speech subsegments.

Accordingly, the video generation module 602 is configured to drive the target character image by use of the character driving network and based on the at least two speech subsegments to obtain at least two character image sequences and determine the to-be-generated video based on the at least two character image sequences.

The preceding product can perform the method according to any embodiment of the present application and has function modules and beneficial effects corresponding to the performed method.

According to an embodiment of the present application, the present application further provides an electronic device, a readable storage medium and a computer program product.

Figure 7:
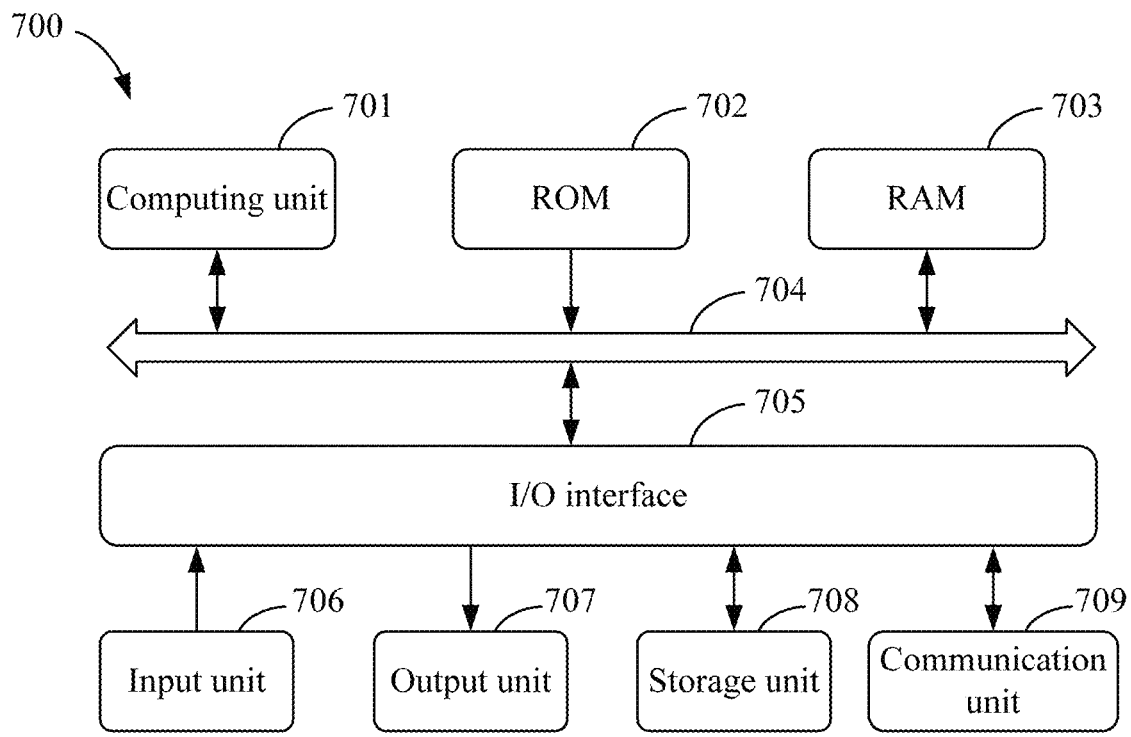
FIG. 7 is a block diagram of an electronic device for performing a video generation method according to an embodiment of the present application.

FIG. 7 is a block diagram of an example electronic device 700 for performing a video generation method according to an embodiment of the present application. Electronic devices are intended to represent various forms of digital computers, for example, laptop computers, desktop computers, worktables, personal digital assistants, servers, blade servers, mainframe computers and other applicable computers. Electronic devices may also represent various forms of mobile devices, for example, the personal digital assistants, cellphones, smartphones, wearable devices and other similar computing devices. Herein the shown components, the connections and relationships between these components, and the functions of these components are illustrative only and are not intended to limit the implementation of the present application as described and/or claimed herein.

As shown in FIG. 7, the device 700 includes a computing unit 701. The computing unit 701 can perform various appropriate actions and processing according to a computer program stored in a read-only memory (ROM) 702 or a computer program loaded into a random-access memory (RAM) 703 from a storage unit 708. The RAM 703 can also store various programs and data required for operations of the device 700. The calculation unit 701, the ROM 702 and the RAM 703 are connected to each other by a bus 704. An input/output (I/O) interface 705 is also connected to the bus 704.

Multiple components in the device 700 are connected to the I/O interface 705. The multiple components include an input unit 706 such as a keyboard or a mouse; an output unit 707 such as a display or a speaker; a storage unit 708 such as a magnetic disk or an optical disk; and a communication unit 709 such as a network card, a modem or a wireless communication transceiver. The communication unit 709 allows the device 700 to exchange information/data with other devices over a computer network such as the Internet and/or over various telecommunication networks.

The computing unit 701 may be a general-purpose and/or special-purpose processing component having processing and computing capabilities. Examples of the computing unit 701 include, but are not limited to, a central processing unit (CPU), a graphics processing unit (GPU), a special-purpose artificial intelligence (AI) computing chip, a computing unit executing machine learning model algorithms, a digital signal processor (DSP), and any appropriate processor, controller and microcontroller. The computing unit 701 performs various preceding methods and processing, such as the video generation method. For example, in some embodiments, the video generation method may be implemented as a computer software program tangibly contained in a machine-readable medium, for example, the storage unit 708. In some embodiments, part or all of computer programs can be loaded and/or installed on the device 700 via the ROM 702 and/or the communication unit 709. When the computer program is loaded into the RAM 703 and executed by the computing unit 701, one or more steps of the preceding video generation method can be performed. Alternatively, in other embodiments, the computing unit 701 may be configured to perform the video generation method in any other appropriate manner (for example, by use of firmware).

The preceding various embodiments of systems and techniques may be implemented in digital electronic circuitry, integrated circuitry, a field-programmable gate array (FPGA), an application-specific integrated circuit (ASIC), an application-specific standard product (ASSP), a system on a chip (SoC), a complex programmable logic device (CPLD), computer hardware, firmware, software and/or any combination thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device and at least one output device and transmitting the data and instructions to the memory system, the at least one input device and the at least one output device.

Program codes for implementation of the method of the present application may be written in any combination of one or more programming languages. These program codes may be provided for the processor or controller of a general-purpose computer, a special-purpose computer or another programmable data processing device to enable functions/operations specified in a flowchart and/or a block diagram to be implemented when the program codes are executed by the processor or controller. The program codes may all be executed on a machine; may be partially executed on a machine; may serve as a separate software package that is partially executed on a machine and partially executed on a remote machine; or may all be executed on a remote machine or a server.

In the context of the present application, the machine-readable medium may be a tangible medium that contains or stores a program available for an instruction execution system, apparatus or device or a program used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any appropriate combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display device (for example, a cathode-ray tube (CRT) or liquid-crystal display (LCD) monitor) for displaying information to the user; and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on the respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service. The server may also be a server of a distributed system or a server combined with a blockchain.

Artificial intelligence (AI) is a subject that enables a computer to simulate certain character thinking processes and intelligent behaviors (such as learning, reasoning, thinking and planning). AI includes both hardware technologies and software technologies. Hardware technologies of AI generally include technologies such as sensors, dedicated artificial intelligence chips, cloud computing, distributed storage, big data processing. Software technologies of AI mainly include major directions such as computer vision technology, speech recognition technology, natural language processing technology, machine learning/deep learning technology, big data processing technology and knowledge graph technology.

Cloud computing is a technology system in which scalable shared physical or virtual resource pools are accessed via a network and resources are deployed and managed in a manner of being available on demand. The resources include servers, operating systems, networks, software, applications and storage devices. Cloud computing enables an efficient and powerful data processing capability in application and model training of technologies such as artificial intelligence and blockchains.

It is to be understood that various forms of the preceding flows may be used, with steps reordered, added or removed. For example, the steps described in the present application may be executed in parallel, in sequence or in a different order as long as the desired result of the technical solution disclosed in the present application is achieved. The execution sequence of these steps is not limited herein.

The scope of the present application is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present application are within the scope of the present application.

What is claimed is:

1. A video generation method, comprising:
   changing a character emotion of an original character image according to a character emotion feature of a to-be-generated video to obtain a target character image; and
   driving the target character image by use of a character driving network and based on a speech segment to obtain the to-be-generated video;
   wherein changing the character emotion of the original character image according to the character emotion feature of the to-be-generated video to obtain the target character image comprises:
   changing the character emotion of the original character image by use of an emotion editing network and based on the character emotion feature of the to-be-generated video to obtain the target character image; and wherein a training process of the emotion editing network comprises:
inputting a sample character image and a first sample emotion feature into the emotion editing network to obtain a first predicted emotion image;
inputting the first predicted emotion image and a second sample emotion feature into the emotion editing network to obtain a second predicted emotion image; and
determining a loss function value based on the second predicted emotion image and the sample character image and training the emotion editing network based on the loss function value,
wherein the first predicted emotion image and the first sample emotion feature correspond to a first emotion type, and the sample character image, the second predicted emotion image and the second sample emotion feature correspond to a second emotion type.

2. The method of claim 1, further comprising:
determining the character emotion feature of the to-be-generated video in response to an emotion selection instruction of a user.

3. The method of claim 2, wherein determining the character emotion feature of the to-be-generated video in response to the emotion selection instruction of the user comprises:
determining a character emotion type of the to-be-generated video and a candidate emotion type of the to-be-generated video in response to the emotion selection instruction of the user; and
performing one-hot encoding of the character emotion type of the to-be-generated video and the candidate emotion type of the to-be-generated video to obtain the character emotion feature of the to-be-generated video.

4. The method of claim 2, wherein determining the character emotion feature of the to-be-generated video in response to the emotion selection instruction of the user comprises:
determining a character emotion type of the to-be-generated video and an emotion degree of the character emotion type in response to the emotion selection instruction of the user; and
generating the character emotion feature of the to-be-generated video according to the character emotion type and the emotion degree.

5. The method of claim 1, wherein driving the target character image by use of the character driving network and based on the speech segment to obtain the to-be-generated video comprises:
performing, by use of an image coding subnetwork in the character driving network, feature extraction of the target character image to obtain a feature image of the target character image;
performing, by use of a speech coding subnetwork in the character driving network, feature extraction of the speech segment to obtain a speech-action association feature; and
performing, by use of a decoding subnetwork in the character driving network, decoding processing of the feature image of the target character image and the speech-action association feature to obtain the to-be-generated video.

6. The method of claim 1, further comprising:
converting a frequency of the speech segment to a preset frequency; and
dividing the converted speech segment into at least two speech subsegments; and accordingly, driving the target character image by use of the character driving network and based on the speech segment to obtain the to-be-generated video comprising:
driving the target character image by use of the character driving network and based on the at least two speech subsegments to obtain at least two character image sequences and determining the to-be-generated video based on the at least two character image sequences.

7. An electronic device, comprising:
at least one processor; and
a memory communicatively connected to the at least one processor, wherein
the memory stores instructions executable by the at least one processor to enable the at least one processor to perform the following steps:
changing a character emotion of an original character image according to a character emotion feature of a to-be-generated video to obtain a target character image; and
driving the target character image by use of a character driving network and based on a speech segment to obtain the to-be-generated video;
wherein the at least one processor is configured to perform changing the character emotion of the original character image according to the character emotion feature of the to-be-generated video to obtain the target character image by:
changing the character emotion of the original character image by use of an emotion editing network and based on the character emotion feature of the to-be-generated video to obtain the target character image;
wherein the at least one processor is configured to perform a training process of the emotion editing network by:
inputting a sample character image and a first sample emotion feature into the emotion editing network to obtain a first predicted emotion image;
inputting the first predicted emotion image and a second sample emotion feature into the emotion editing network to obtain a second predicted emotion image; and
determining a loss function value based on the second predicted emotion image and the sample character image and training the emotion editing network based on the loss function value,
wherein the first predicted emotion image and the first sample emotion feature correspond to a first emotion type, and the sample character image, the second predicted emotion image and the second sample emotion feature correspond to a second emotion type.

8. The electronic device of claim 7, wherein the at least one processor is configured to further perform:
determining the character emotion feature of the to-be-generated video in response to an emotion selection instruction of a user.

9. The electronic device of claim 8, wherein the at least one processor is configured to perform determining the character emotion feature of the to-be-generated video in response to the emotion selection instruction of the user by:
determining a character emotion type of the to-be-generated video and a candidate emotion type of the to-be-generated video in response to the emotion selection instruction of the user; and
performing one-hot encoding of the character emotion type of the to-be-generated video and the candidate emotion type of the to-be-generated video to obtain the character emotion feature of the to-be-generated video.

10. The electronic device of claim 8, wherein the at least one processor is configured to perform determining the character emotion feature of the to-be-generated video in response to the emotion selection instruction of the user by:
- determining a character emotion type of the to-be-generated video and an emotion degree of the character emotion type in response to the emotion selection instruction of the user; and
- generating the character emotion feature of the to-be-generated video according to the character emotion type and the emotion degree.

11. The electronic device of claim 7, wherein the at least one processor is configured to perform driving the target character image by use of the character driving network and based on the speech segment to obtain the to-be-generated video by:
- performing, by use of an image coding subnetwork in the character driving network, feature extraction of the target character image to obtain a feature image of the target character image;
- performing, by use of a speech coding subnetwork in the character driving network, feature extraction of the speech segment to obtain a speech-action association feature; and
- performing, by use of a decoding subnetwork in the character driving network, decoding processing of the feature image of the target character image and the speech-action association feature to obtain the to-be-generated video.

12. The electronic device of claim 7, wherein the at least one processor is configured to further perform:
- converting a frequency of the speech segment to a preset frequency; and
- dividing the converted speech segment into at least two speech subsegments; and
- accordingly, driving the target character image by use of the character driving network and based on the speech segment to obtain the to-be-generated video comprising:
- driving the target character image by use of the character driving network and based on the at least two speech subsegments to obtain at least two character image sequences and determining the to-be-generated video based on the at least two character image sequences.

13. A non-transitory computer-readable storage medium, storing computer instructions for causing a computer to perform the following steps:
- changing a character emotion of an original character image according to a character emotion feature of a to-be-generated video to obtain a target character image; and
- driving the target character image by use of a character driving network and based on a speech segment to obtain the to-be-generated video;
- wherein the computer is configured to perform changing the character emotion of the original character image according to the character emotion feature of the to-be-generated video to obtain the target character image by:
- changing the character emotion of the original character image by use of an emotion editing network and based on the character emotion feature of the to-be-generated video to obtain the target character image;
- wherein the computer is configured to perform a training process of the emotion editing network by:
- inputting a sample character image and a first sample emotion feature into the emotion editing network to obtain a first predicted emotion image;
- inputting the first predicted emotion image and a second sample emotion feature into the emotion editing network to obtain a second predicted emotion image; and
- determining a loss function value based on the second predicted emotion image and the sample character image and training the emotion editing network based on the loss function value,
- wherein the first predicted emotion image and the first sample emotion feature correspond to a first emotion type, and the sample character image, the second predicted emotion image and the second sample emotion feature correspond to a second emotion type.

14. The storage medium of claim 13, wherein the computer is configured to further perform:
- determining the character emotion feature of the to-be-generated video in response to an emotion selection instruction of a user.

* * * * *